(No Model.) 2 Sheets—Sheet 1.

M. MOSKOWITZ.
STORAGE BATTERY.

No. 549,649. Patented Nov. 12, 1895.

WITNESSES:
Q. Basil Hooper.
Wm. H. Canfield Jr.

INVENTOR:
MORRIS MOSKOWITZ.
BY
Fred C. Fraentzel,
ATTORNEY (No Model.) 2 Sheets—Sheet 2.

M. MOSKOWITZ.
STORAGE BATTERY.

No. 549,649. Patented Nov. 12, 1895.

WITNESSES:
G. Basil Hooper.
Wm. H Canfield, Jr.

INVENTOR:
MORRIS MOSKOWITZ.
BY
Fred C. Fraentzel,
ATTORNEY

UNITED STATES PATENT OFFICE.

MORRIS MOSKOWITZ, OF NEWARK, NEW JERSEY, ASSIGNOR TO HIMSELF AND LEON D. ADLER, OF SAME PLACE, ABRAHAM S. ADLER, OF PHILADELPHIA, PENNSYLVANIA, AND THEODORE W. MYERS, OF NEW YORK, N. Y.

STORAGE-BATTERY.

SPECIFICATION forming part of Letters Patent No. 549,649, dated November 12, 1895.

Application filed April 20, 1895. Serial No. 546,451. (No model.)

*To all whom it may concern:*

Be it known that I, MORRIS MOSKOWITZ, a citizen of the United States, residing at Newark, in the county of Essex and State of New Jersey, have invented certain new and useful Improvements in Storage-Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference to improvements in storage-batteries, and the aim of my invention is to produce a cheap, strong, and durable element having a large surface, and which is adapted to receive and securely retain the active material, being subject to a free circulation of acid around the same.

In the construction of storage-batteries now in use the elements are usually arranged in vertical positions with separating plates between them, and in these constructions of batteries there naturally is a high resistance, which, from an electrical standpoint, renders the battery inefficient. On the other hand, in batteries where there is nothing between the elements and in which the acid can circulate freely, there will be a high efficiency, but the elements are liable to "buckling," causing short circuits in the cell. To overcome these defects is the primary object of my invention, and to this end the invention consists in the novel form of storage-battery, and also in the minor arrangements and combinations of parts, to be hereinafter fully described and finally embodied in the clauses of the claim.

My object is to construct a storage-battery which shall be very efficient and in which the so-called "separators," either perforated or porous or those made of asbestos cloth, are entirely dispensed with, and whereby a high internal resistance is successfully overcome.

The invention is illustrated in the accompanying sheets of drawings, in which—

Figure 1:
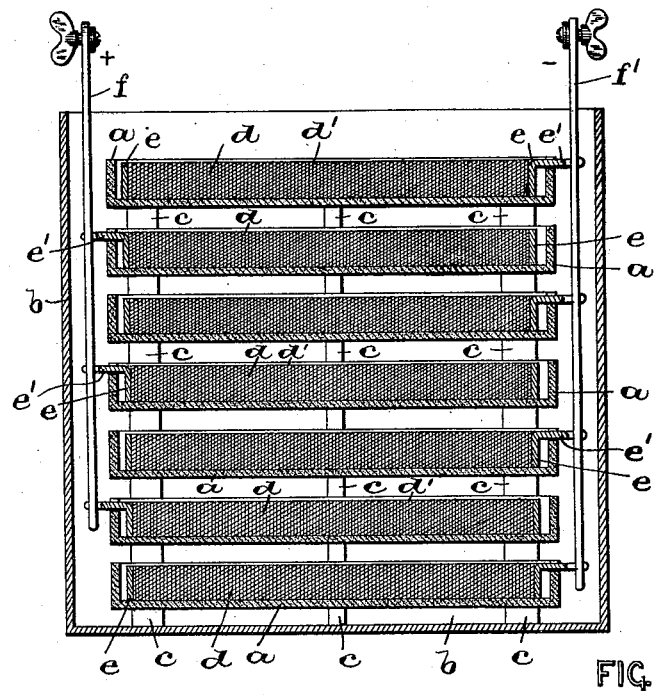
Figure 2:
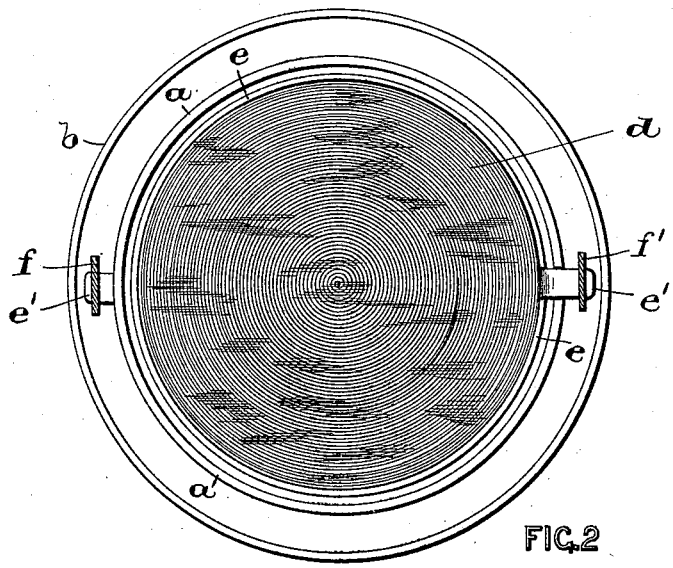
Figure 3:
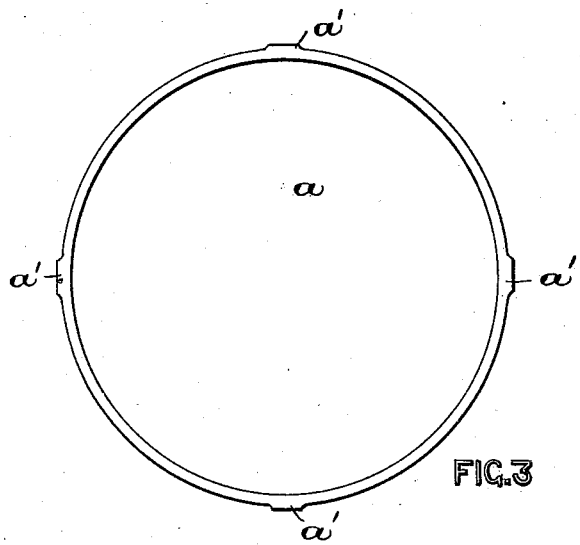
Figure 4:
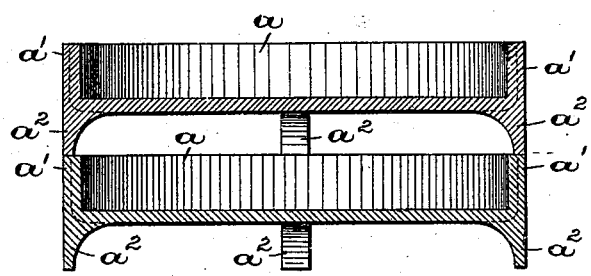
Figure 5:
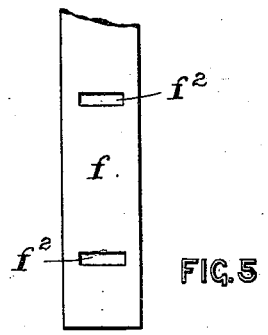

Figure 1 is a vertical section of my novel form of storage-battery, and Fig. 2 is a top view of the same. Fig. 3 is a plan view of one form of shallow-cup used in the battery for the reception of a suitable active material. Fig. 4 is a vertical section of several of said shallow cups to clearly illustrate one manner of arranging them, one on top of the other, in the cell of the battery. Fig. 5 is a detail view of one of the connections for connecting the several elements of the battery.

Similar letters of reference are employed in each of the above-described views to indicate like parts.

Referring to said drawings, $b$ indicates the cell of the battery, which may be circular or square in cross-section, or it may be of any other desirable shape. Within said cell $b$, I have arranged any suitable number of shallow cups or pans $a$, which may be circular or square, or of any other desirable outline, said cups or pans being made of a non-conducting, porous, or other suitable material. Said pans, as will be seen from Fig. 1, are arranged in such a manner that the lower pan rests upon suitable blocks or supports $c$ of a non-conducting material, while the other pans are separated from each other by similar blocks or supports $c$, whereby a space is formed between each two consecutively-arranged pans $a$, and also betwen the lower pan and the base of the cell, as clearly shown. By this arrangement of the pans $a$, it will be clearly evident that the acid in the cell $b$ can circulate freely around each pan and can come in operative contact with the large surface $d'$ of the active material $d$ in the pans $a$, exposed to the action of the acid. Said active material $d$ in said pans or cups may be coils of lead, aluminum, or any other appropriate metal or material, which is spirally or otherwise arranged in a suitable ring or frame $e$ of lead or other metal. Each ring $e$ is provided with small projecting pieces or ears $e'$, which extend into openings or holes $f^2$ in the main connections $f$ and $f'$, as shown, the positive connection being on one side and the negative connection on the other side of the elements.

The active material $d$ is arranged in the ring or band *e* in any convenient manner, and is placed with said ring in one of the shallow pans or cups *a*. The connections *f* and *f'* are then securely connected with the ears *e'* of said rings *e*, and the whole is placed in the cell *b*, with the acid freely circulating around said parts to form an efficient and powerful battery. As is clearly shown in said Fig. 1, each pan *a* is provided with a ring or frame *e*, and the active material arranged therein.

In lieu of the separating blocks or supports *c*, each pan or cup *a* may be provided with outwardly-extending lugs or ears *a'* and the feet $a^2$ formed integral with the body of the pan, whereby two or more pans can be readily placed on top of each other, forming a space between them, as will be clearly seen from Fig. 4, the legs $a^2$ of the upper pan resting on the lugs or ears *a'* on the next lower pan.

Of course it will be understood that the pans *a* may be made of any suitable non-conducting material; but porous pottery is preferred, as it is useful in enabling the acid to finally penetrate through the pores of the material.

In order that my invention may not be confounded with the use of other types of batteries in which the well-known forms of deep porous cups are used, I will state more fully that it is my intention to use porous or other like pans *a*, which are very shallow, said pans being entirely open at the top and entirely immersed in the acid, that the latter can freely bathe the entire upper surface of each element and can penetrate between the contiguous surfaces of the active material in the rings or frames *e*, said active material being firmly held in said rings or frames, whereby it can be removably placed in the cups or pans *a*, being capable of being lifted from the pan when the connections *f* and *f'* are removed. This is a new feature in storage-batteries, and readily allows the removal of the active material from a cup, to be replaced by a new ring and active material held by the same.

I am well aware that porous cups or vessels have been used in the constructions of batteries; but these forms of cups are deep and are closed at the top and all around, causing the acid to force its way through the pores of the cup with a high internal resistance and little electrical efficiency. In my novel construction of battery, however, the porous cups or pans are very shallow, and being left open at the top and entirely under the acid in the cell, the active material comprising the elements of the battery is exposed to the action of the acid with no internal resistance, and hence a maximum electrical energy will be the result.

My arrangement of shallow cups or pans *a* provides for a strong support for the active material, prevents any possibility of the positive and negative elements coming in contact to cause short-circuiting, and the acid is not prevented from flowing quickly and directly into the active material, thus reaching every part of the active material without first forcing its way through the pores of the supporting cup. The said supports or block *c*, hereinabove mentioned, may be made of any suitable material, and may be made of soft rubber to cushion one porous cup or pan *a* from the other when the battery is subjected to considerable vibration.

It will be understood that my novel form of construction of elements herein shown and claimed are adapted for use and are suitable for any type of storage-battery known.

Having thus described my invention, what I claim is—

1. A storage battery, comprising therein, a cell, shallow cups or pans *a* open at the top, a metallic ring or frame *e* in each cup or pan, an active material *d* firmly secured in each ring, whereby the same is removably arranged with said rings in the cups or pans, connections *f* and *f'* connected with said rings or frames *e*, and means between said cups or pans for separating them and exposing the surface of the active material directly to the action of the acid in the battery, substantially as and for the purposes set forth.

2. A storage battery, comprising therein, a cell, shallow pans or cups *a* open at the top, a metallic ring or frame *e* in each cup or pan, provided with lugs or ears *e'*, an active material *d* firmly secured in each ring or frame, whereby the same is removably arranged with said rings in the cups or pans, connections *f* and *f'* having openings $f^2$ in which said ears or lugs *e'* are secured, and means between cups or pans for separating them and exposing the surface of the active material directly to the action of the acid in the battery, substantially as and for the purposes set forth.

3. A storage battery embracing therein, positive and negative elements, comprising shallow cups or pans *a* of a non-conducting material, said cups or pans being open at the top and provided with an active material, lugs or ears *a'* on said pans or cups and legs $a^2$ corresponding in position to the positions of said lugs or ears *a'*, to separate said pans or cups and exposing the surface of the active material to the action of the acid in the battery, and a metallic ring or frame in each cup or pan, an active material held in said ring, and connections *f* and *f'* connected with said metallic rings, substantially as and for the purposes set forth.

In testimony that I claim the invention set forth above I have hereunto set my hand this 18th day of April, 1895.

MORRIS MOSKOWITZ.

Witnesses:
　FREDK. C. FRAENTZEL,
　WM. H. CAMFIELD, Jr.